(12) United States Patent
Molkow et al.

(10) Patent No.: US 7,712,392 B2
(45) Date of Patent: May 11, 2010

(54) ELECTRICAL SHIFTING DEVICE FOR A MOTOR VEHICLE

(75) Inventors: Peter Molkow, Dortmund (DE); Ralf Böbel, Holzwickede (DE); Thomas Luksch, Schalksmühle (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 338 days.

(21) Appl. No.: 11/900,053

(22) Filed: Sep. 10, 2007

(65) Prior Publication Data

US 2008/0028886 A1 Feb. 7, 2008

Related U.S. Application Data

(63) Continuation of application No. PCT/EP2006/004899, filed on May 23, 2006.

(30) Foreign Application Priority Data

May 24, 2005 (DE) ........................ 10 2005 023 926

(51) Int. Cl.
*G05G 5/00* (2006.01)
(52) U.S. Cl. .................................. 74/473.21
(58) Field of Classification Search ............ 74/473.21, 74/473.23, 473.24, 473.25, 473.26, 473.28, 74/523
See application file for complete search history.

(56) References Cited

U.S. PATENT DOCUMENTS

| 5,036,962 | A | * | 8/1991 | Amagasa | ............... 70/251 |
|---|---|---|---|---|---|
| 5,415,056 | A | | 5/1995 | Tabata et al. | |
| 5,902,209 | A | | 5/1999 | Moody | |
| 6,676,564 | B2 | | 1/2004 | Gruden | |
| 6,834,562 | B2 | * | 12/2004 | Esly et al. | .................. 74/335 |
| 2001/0046819 | A1 | * | 11/2001 | Kawai et al. | ............... 440/84 |
| 2003/0188594 | A1 | | 10/2003 | Levin et al. | |

FOREIGN PATENT DOCUMENTS

| CH | 247583 | | 3/1947 |
|---|---|---|---|
| DE | 37 42 600 | A1 | 7/1989 |
| DE | 196 53 171 | A1 | 6/1998 |
| DE | 100 59 383 | A1 | 6/2002 |
| EP | 0 589 145 | A2 | 3/1994 |
| EP | 1 314 916 | A1 | 5/2003 |
| JP | 01249527 | A * | 10/1989 |
| JP | 10-16593 | A | 1/1998 |

* cited by examiner

*Primary Examiner*—Vicky A Johnson
(74) *Attorney, Agent, or Firm*—Brooks Kushman P.C.

(57) ABSTRACT

A shifting device for a vehicle includes a shift lever, a limiting element, and an actuator. The lever is movable in opposite first and second directions along an actuating path between neutral and end positions. The limiting element is movable into and out of the path. When the limiting element is in the path, the limiting element impacts the lever while the lever is in the neutral position to prevent the lever from moving from the neutral position in the first direction such that the limiting element acts as a shift lock blocking the lever from the end position. When the limiting element is out of the path, the limiting element allows the lever to move into the end position. The actuator is operable for moving the limiting element into and out of the path such that the actuator is operable for activating and deactivating the lock for the lever.

5 Claims, 3 Drawing Sheets a)

b)

a)

b)

ELECTRICAL SHIFTING DEVICE FOR A MOTOR VEHICLE

CROSS-REFERENCE TO RELATED APPLICATIONS

This is a continuation of International Application PCT/EP2006/004899, published in German, with an international filing date of May 23, 2006, which claims priority to DE 10 2005 023 926.9, filed May 24, 2005, the disclosures of which are both hereby incorporated by reference.

BACKGROUND OF THE INVENTION

1. Field of the Invention

The present invention relates to an electrical shifting device for a vehicle in which the shifting device includes a shift lever and an actuator which activates and deactivates a shift lock for the shift lever.

2. Background Art

An electrical shifting device having a shift lever is used in a vehicle having an automatic transmission. A motor or the like carries out the actual shifting procedure of the shifting device whereas the particular shifting intention (i.e., shifting state) of the shifting device by an operator (such as the driver of the vehicle) is electrically detected based on the position of the shift lever. In an automatic transmission, the shifting device together with the shift lever and possibly also rocker switches on the steering wheel for gearing up and down are provided in the vehicle for the operator.

A shift lever may have either a multi-stable or mono-stable design. A shift lever having a multi-stable design is movable between multiple fixed positions. A shift lever having a mono-stable design functions like a joystick having a single neutral position to which the shift lever returns from each of a number of unstable positions.

In either case it may be desirable, depending on the currently selected shifting state, to exclude certain shifting states from the next selection. With a linear chain of possible shifting states, for example, it is advantageous to indicate when the selection options in a shifting direction have been used up. As the detection and processing of particular shifting states are performed electronically, certain shifting states can be excluded by the underlying shifting logic.

For ergonomics it is advantageous for the operator of the shifting device to directly receive haptic feedback indicative of shifting states (i. e., shifting functions) which are not selectable at a given time. Typically, locks or stops which cooperate with the shift lever provide such feedback.

EP 1 464 875 A1 (corresponding to U.S. Patent Application Publication No. 2004/0194567) describes a shifting device having a shift lever and an actuating device. The actuating device is able to deactivate a shift lock for the shift lever such that the shift lever is pivotable over the shift position defined by the shift lock. The actuating device has a relatively complex design and includes a toggle switch and an actuator for actuating the toggle switch.

SUMMARY OF THE INVENTION

An object of the present invention includes an electrical shifting device having a shift lever in which a limiting element actuated by an actuator limits the actuating path of the shift lever with the mechanical means used for this purpose being simple and economical.

In carrying out the above object and other objects, the present invention provides a shifting device for a vehicle. The shifting device includes a shift lever, a limiting element, and an actuator. The shift lever is movable in opposite first and second directions along an actuating path between a neutral position and an end position. The limiting element is movable into and out of the actuating path of the shift lever. When the limiting element is in the actuating path of the shift lever the limiting element impacts the shift lever while the shift lever is in the neutral position to prevent the shift lever from moving from the neutral position in the first direction such that the limiting element acts as a shift lock blocking the shift lever from the end position. When the limiting element is out of the actuating path of the shift lever the limiting element allows the shift lever to move into the end position. The actuator is operable for moving the limiting element into and out of the actuating path of the shift lever such that the actuator is operable for activating and deactivating the shift lock for the shift lever.

In accordance with embodiments of the present invention, a limiting element(s) is located in an actuating path(s) of a shift lever of an electrical shifting device. The position of an extension of the limiting element within an actuating path of the shift lever may be changed by an actuator such that movement of the shift lever in a direction along the actuating path may be blocked or enabled.

In accordance with embodiments of the present invention, the limiting element may have a single-part or multi-part design. A single-part limiting element includes an eccentric mounted on a rotatable shaft. A two-part limiting element includes slide elements mounted in a mutually displaceable manner. Additionally, one or more slide elements placed in the actuating path of the shift lever may form a limiting element.

The limiting element together with the actuator may advantageously form a mono-stable system. In this case, a spring acts on the limiting element or the actuator and returns to its original position when actuation of the limiting element has ended.

In accordance with embodiments of the present invention, a use of the shifting device includes blocking shifting paths of a mono-stable or multi-stable gear selector as a function of the gear speeds already engaged.

The above features, other features, and advantages of the present invention are readily apparent from the following detailed descriptions thereof when taken in connection with the accompanying drawings.

DETAILED DESCRIPTION OF THE PREFERRED EMBODIMENT(S)

Figure 1:
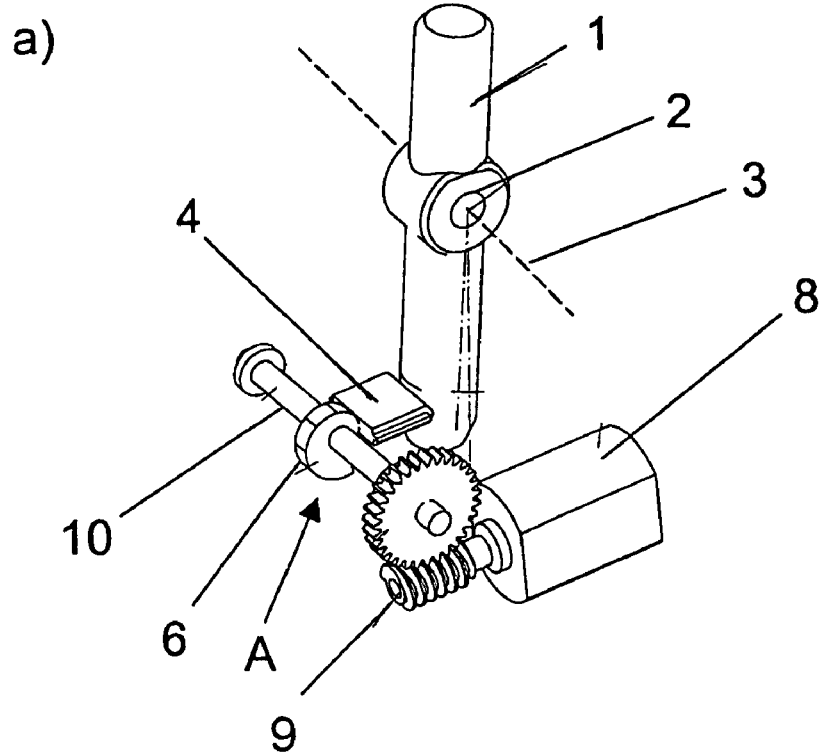
FIG. 1a illustrates an electrical shifting device having an eccentric as a limiting element in accordance with an embodiment of the present invention in which the eccentric is at a position "A" to not limit movement of a shift lever of the shifting device along an actuating path.
FIG. 1b illustrates the shifting device shown in FIG. 1a in which the eccentric is at a position "B" to limit movement of the shift lever from a neutral position in one direction along the actuating path.
Figure 1:
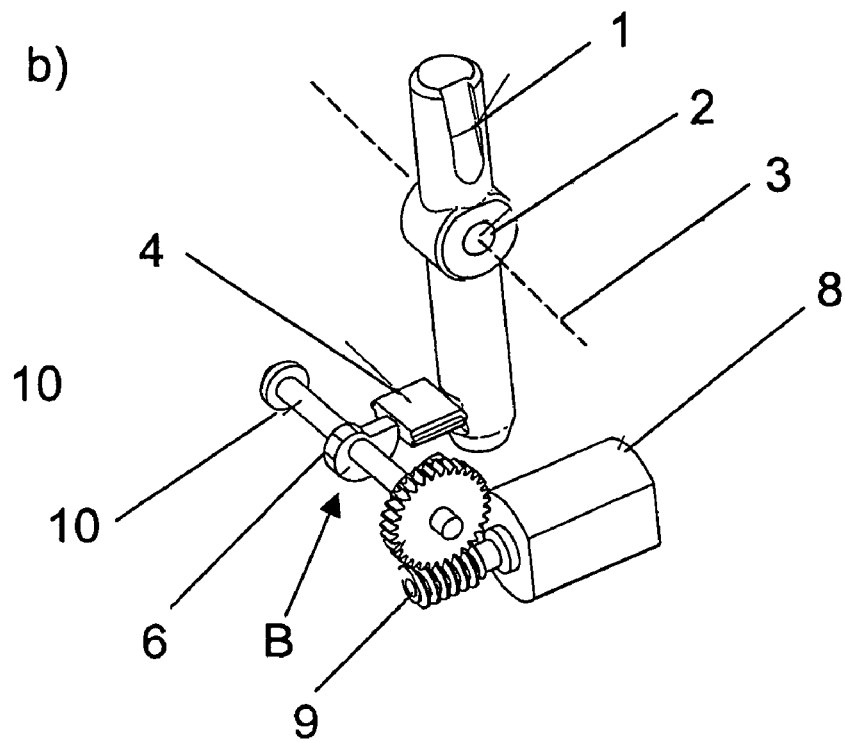

The Figures illustrate features of electrical shifting devices in accordance with the present invention. The same reference numerals denote like elements in the Figures.

Referring now to FIGS. 1a and 1b, an electrical shifting device in accordance with an embodiment of the present invention is shown. The shifting device includes a shift lever 1. Shift lever 1 has a recess 2 for a rotational axis 3 about which the shift lever may swivel. Shift lever 1 may swivel in first and second directions along an actuating path between first and second end positions. Shift lever 1 has a middle neutral position along the actuating path between the first and second end positions. In FIG. 1a, shift lever 1 is at the first end position in which shift lever 1 has moved in the first direction from the middle neutral position. In FIG. 1b, shift lever 1 is at the middle neutral position. Shift lever 1 may have further motion possibilities which may be realized, for example, by a cardanic bearing.

The shifting device further includes a limiting element in the form of an eccentric 6. Eccentric 6 is mounted on a rotatable shaft 10 to rotate with shaft 10. An electric motor 8 (i.e., an actuator 8) drives shaft 10 together with eccentric 6 via a worm gear 9. Alternatively, shaft 10 together with eccentric 6 may be rotated by a linearly acting actuator via a crank mechanism.

Eccentric 6 includes an extension. Depending on the rotational position of eccentric 6, the extension of eccentric 6 is located either within or out of the actuating path of shift lever 1. When the extension of eccentric 6 is located within the actuating path of shift lever 1, the lower section of shift lever 1 impacts eccentric 6 upon being moved (i.e., swivelled about rotational axis 3) from the middle neutral position in one direction along the actuating path toward the eccentric. As such, movement of shift lever 1 in the one direction along the actuating path is blocked. Conversely, when the extension of eccentric 6 is located out of the actuating path of shift lever 1, the lower section of shift lever 1 does not impact eccentric 6 upon being moved from the middle neutral position in the one direction along the actuating path toward eccentric 6. As such, movement of shift lever 1 in the one direction along the actuating path is enabled.

To facilitate better mechanical coupling between shift lever 1 and eccentric 6, a plastic spacer 4 is connected to the lower section of shift lever 1.

Eccentric 6 may rotate between two positions "A" and "B". FIG. 1a illustrates eccentric 6 in position A whereas FIG. 1b illustrates eccentric 6 in position B. In position A, the extension of eccentric 6 is located out of the actuating path of shift lever 1. As such, movement of shift lever 1 in the one direction along the actuating path is not blocked. Position A of eccentric 6 corresponds to an unlocked state in which eccentric 6 does not limit the actuating path of shift lever 1. Shift lever 1 is thus able to move back and forth freely, at least between a shift lever position deflected in the direction of eccentric 6 and the middle neutral shift lever position. On the other hand, in position B, the extension of eccentric 6 is located within the actuating path of shift lever 1 such that the extension holds spacer 4 against the lower section of shift lever 1 whereby deflection of shift lever 1 along the actuating path in the direction of eccentric 6 is blocked. Position B of eccentric 6 corresponds to a locked state in which eccentric 6 limits the actuating path of shift lever 1.

As described, eccentric 6 may exert a limiting effect on one actuating direction of shift lever 1. Additional limiting devices such as additional eccentrics with respective shafts may be provided to exert limiting effects on other actuating directions of shift lever 1.

Actuator 8 may be used to automatically return shift lever 1 to the middle neutral position when shift lever 1 is supported to engage in the possible shift positions (e.g., the first and second end positions) in a locking manner. For example, if shift lever 1 is in the deflected shift lever position illustrated in FIG. 1a (e.g., the first end position) while eccentric 6 is at position A, then rotation of shaft 10 by actuator 8 to rotate eccentric 6 to position B causes shift lever 1 to move back to its middle neutral shift lever position via spacer 4. When eccentric 6 is moved from position B back to position A, eccentric 6 once again releases shift lever 1 via spacer 4 and allows shift lever 1 to be freely actuated. On the other hand, if eccentric 6 remains in position B, then actuation of shift lever 1 in the direction of eccentric 6 remains blocked. The forces to be absorbed by the lock are received by a bearing point of shaft 10 located next to eccentric 6.

A feature of this shifting device is that in the absence of power to actuator 8 an operator of shift lever 1 is no longer able to release the engaged lock (i.e., position B) on account of the self-locking of worm gear 9. In such a case, the freedom of motion of shift lever 1 therefore remains limited.

Figure 2:
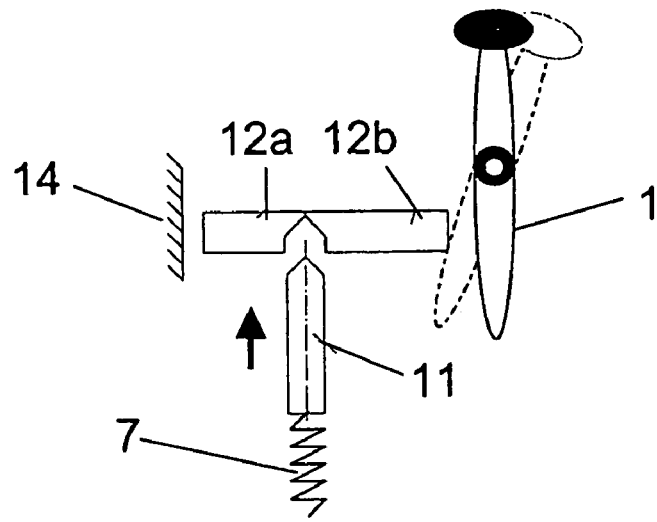
FIG. 2a illustrates an electrical shifting device having two slide elements as a limiting element in accordance with an embodiment of the present invention in which the slide elements are at a position to not limit movement of a shift lever of the shifting device along an actuating path.
FIG. 2b illustrates the shifting device shown in FIG. 2a in which the slide elements are at a position to limit movement of the shift lever from a neutral position in one direction along the actuating path.
Figure 2:
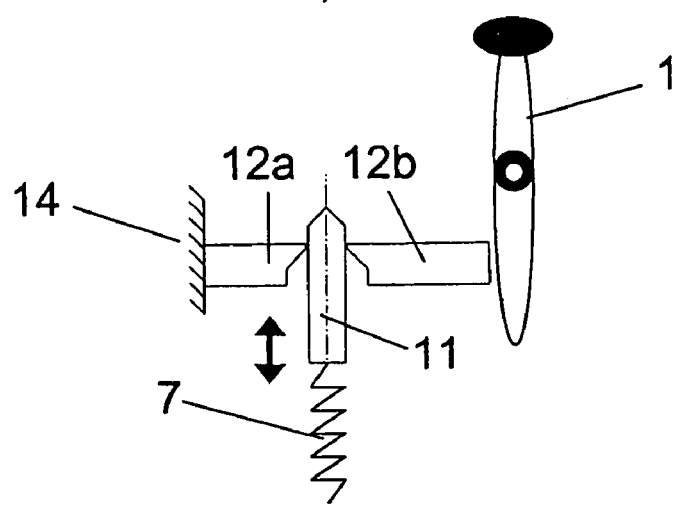

Referring now to FIGS. 2a and 2b, an electrical shifting device in accordance with another embodiment of the present invention is shown. Shift lever 1 of this shifting device is pivotable in first and second directions along an actuating path between first and second end positions. Shift lever 1 has a middle neutral position along the actuating path between the first and second end positions. In FIG. 2a, the solid line of shift lever 1 represents shift lever 1 in the middle neutral position whereas the dotted line of shift lever 1 represents shift lever 1 pivoted in the first direction into the first end position. In FIG. 2b, shift lever 1 is in the middle neutral position.

The shifting device includes a limiting element in the form of first and second slide elements 12a, 12b. Slide elements 12a, 12b are slidable along a lateral direction away and toward one another. Slide elements 12a, 12b are interposed in the actuating path of shift lever 1 between shift lever 1 on one side and a housing wall 14 of the shifting device on the other side. In FIG. 2a, slide elements 12a, 12b are at a position in the actuating path so as to not limit movement of shift lever 1 along the actuating path. In FIG. 2b, slide elements 12a, 12b are at a position in the actuating path so as to limit movement of shift lever 1 from the middle neutral position in the first direction toward the first end position along the actuating path.

An actuator is operable to push a plunger 11 between slide elements 12a, 12b and to pull the plunger away from slide elements 12a, 12b. Plunger 11 and slide elements 12a, 12b have mutually inclined stop faces. As a result, when pushed between slide elements 12a, 12b, plunger 11 causes first slide element 12a to move in the first direction by half the width of plunger 11 toward housing wall 14 and press against housing wall 14. Correspondingly, plunger 11 causes second slide element 12b to move in the second direction toward shift lever 1 by half the width of plunger 11 and press against shift lever 1.

As a result of the motion of second slide element 12b toward shift lever 1 while shift lever 1 is in the first end position, shift lever 1 moves in the second direction from the deflected shift lever position (i.e., the first end position) back toward the middle neutral shift lever position (shown in FIG. 2a).

If plunger 11 remains between slide elements 12a, 12b (shown in FIG. 2b), then the actuating path of shift lever 1 is limited in that shift lever is not able to move in the first direction from the middle neutral position toward housing wall 14. Consequently, shift lever 1 is blocked from moving into the first end position. If shift lever 1 is then attempted to be moved in the first direction, then shift lever 1 presses against second slide element 12b with the maintaining force being transmitted via second slide element 12b, plunger 11, and first slide element 12a onto housing wall 14.

Plunger 11 may have a mono-stable design as a result of a restoring spring 7 acting on plunger 11 or the actuator. If the actuator is not actuated or fails because of a defect, then spring 7 pulls plunger 7 away from slide elements 12a, 12b back to its neutral position to thereby release slide elements 12a, 12b. In this manner, an emergency operation function may be realized in which the shifting path is not limited.

Figure 3:
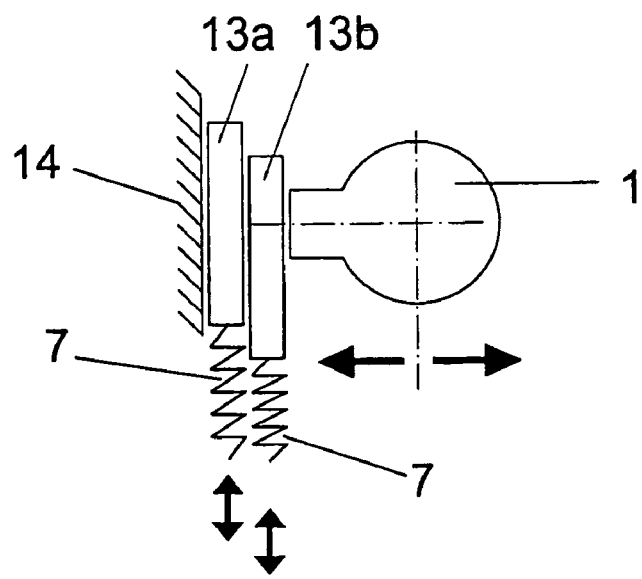
FIG. 3 illustrates a cross-sectional view of an electrical shifting device having multiple slide elements as a limiting element in accordance with an embodiment of the present invention.

Referring now to FIG. 3, an electrical shifting device in accordance with another embodiment of the present invention is shown. Shift lever 1 of the shifting device has two possible opposite actuating directions along an actuating path. The shifting device has a limiting element in the form of a plurality of slide elements 13a, 13b. Slide elements 13a, 13b are linearly movable into and out of the actuating path between housing wall 14 and shift lever 1 by respective actuators. The width of each slide element 13a, 13b determines the path limitation(s) of shift lever 1. If a limitation is required in several gears, multiple slide elements 13a, 13b may be simultaneously moved by a plurality of actuators. First slide element 13a is supported by wall 14 and all subsequent slide elements such as second slide element 13b are supported by the respective preceding slide element. The absorbed forces are transmitted to wall 14. In order to block shift lever 1 in two opposite actuating directions, the locking system is structured for each respective actuating direction.

The locking system may have a monostable design. In this regard, slide elements 13a, 13b are held in a neutral position by restoring springs 7 which are linked either to the actuators or directly to slide elements 13a, 13b. If the actuators are not actuated or fail because of a defect, springs 7 guide slide elements 13a, 13b back to the neutral position and allow unblocked actuation of shift lever 1 as an emergency operation function.

Figure 4:
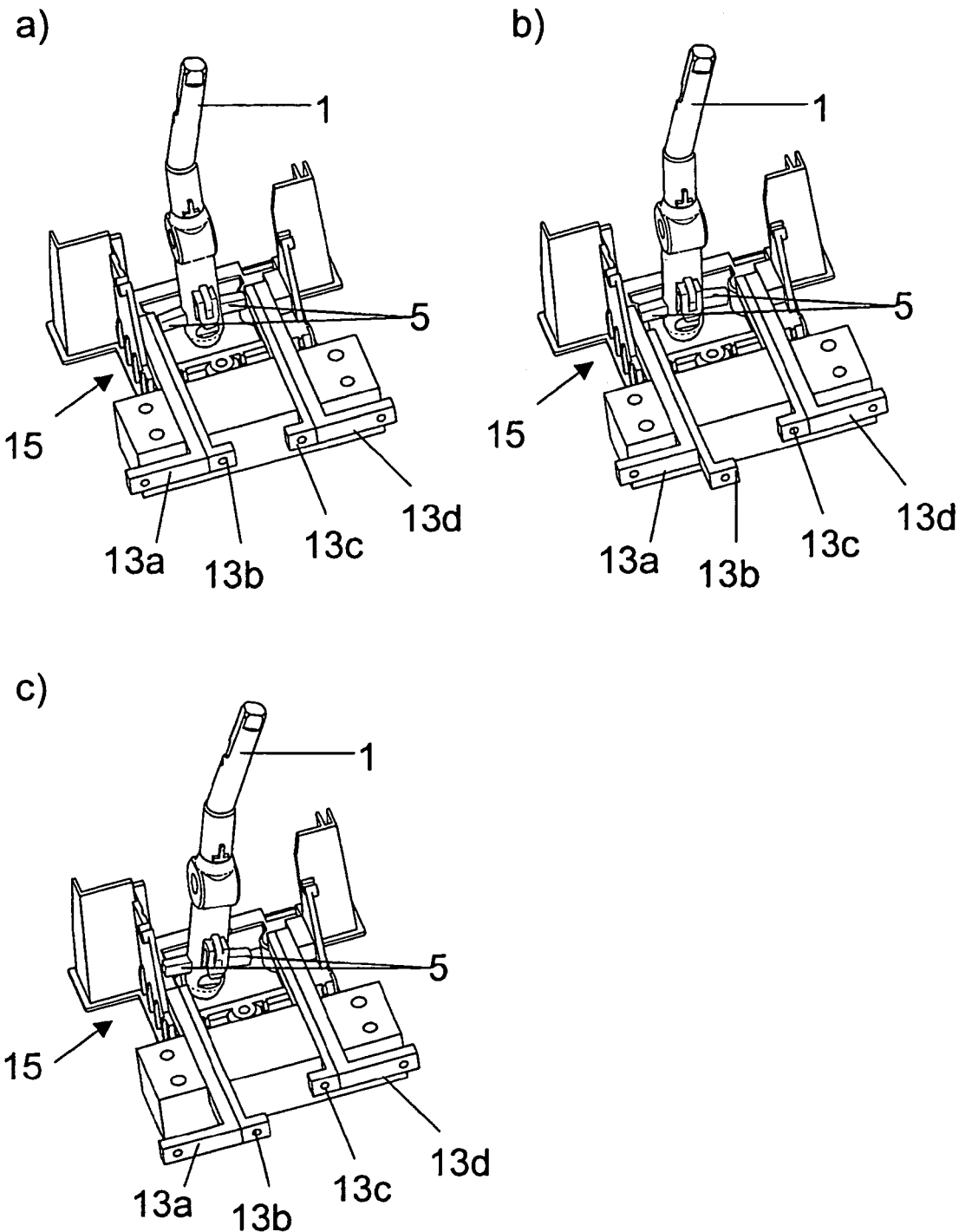
FIGS. 4a, 4b, and 4c illustrate an electrical shifting device having multiple slide elements as a limiting element in accordance with an embodiment of the present invention in which the slide elements are illustrated in various shift positions.

Referring now to FIGS. 4a, 4b, and 4c, an electrical shifting device having multiple slide elements 13a, 13b, 13c, and 13d as a limiting element in accordance with an embodiment of the present invention is shown. FIGS. 4a, 4b, and 4c illustrate the slide elements in various shift positions. Like the shifting device shown in FIG. 3, this shifting device has an actuating path limitation realized by multiple slide elements. Shift lever 1 of this shifting device is situated within a shift lever housing 15 and may swivel at least on one plane approximately parallel to the plane of the drawing sheet. A pair of pin-shaped molded elements 5 on shift lever 1 also extend in this actuating plane.

Slide elements 13a, 13b, 13c, 13d each have an L-shaped profile and are situated on shift lever housing 15. The longer legs of each pair of slide elements contact one another in parallel and the shorter legs each extend in opposite directions. Slide elements 13a, 13b, 13c, 13d are movably mounted on shift lever housing 15, and may be displaced relative to shift lever housing 15 by one or more actuators. Each slide element 13a, 13b, 13c, 13d may reach a position in which one end section projects into the swivel plane of shift lever 1. Because in this position pin-shaped molded elements 5 impact slide elements 13a, 13b, 13c, 13d when shift lever 1 is moved, the actuating path of shift lever 1 is limited.

In FIG. 4a, end sections of slide elements 13a, 13b, 13c, 13d lie in the swivel plane of shift lever 1. Since little free space thus remains between pin-shaped molded elements 5 and slide elements 13a, 13b, 13c, 13d, the mobility of shift lever 1 at least in the left-right direction is maximally limited and shift lever 1 is thereby virtually blocked.

In FIG. 4b, slide element 13b is removed from the swivel region of shift lever 1. This allows shift lever 1 to partially swivel to the left, whereas actuation of shift lever 1 to the right is still prevented by slide elements 13c and 13d which block shift lever 1.

In FIG. 4c, slide elements 13a and 13b are removed from the actuating path of shift lever 1 thereby allowing unlimited swiveling of shift lever 1 to the left. A corresponding release of shift lever 1 in the actuating direction to the right may be achieved by appropriate control of slide elements 13c and 13d.

REFERENCE NUMERALS

1 Shift lever
2 Recess
3 Rotational axis
4 Spacer
5 Pin-shaped molded elements
6 Eccentric
7 Restoring spring
8 Electric motor (actuator)
9 Worm gear
10 Eccentric shaft
11 Plunger
12a, 12b Slide elements
13a, 13b, 13c, 13d Slide elements
14 Housing wall
15 Shift lever housing
A, B Eccentric positions While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A shifting device for a vehicle, the shifting device comprising:
a shift lever extending along a longitudinal axis, the lever being rotatable in opposite first and second rotational directions about a rotatable axis which extends through the lever and is perpendicular to the longitudinal axis such that a portion of the lever is movable in opposite first and second arcuate directions along an actuating path lying in a plane perpendicular to the plane defined by the longitudinal and rotatable axes;
wherein in response to rotation of the lever in the first rotational direction, the lever portion is movable in the first arcuate direction along the actuating path from a neutral position lying in the plane defined by the longitudinal and rotatable axes to a first end position lying on a first side of the plane defined by the longitudinal and rotatable axes, and the lever portion is movable in the first arcuate direction along the actuating path from a second end position lying on a second side of the plane defined by the longitudinal and rotatable axes and the neutral position;

wherein in response to rotation of the lever in the second rotational direction, the lever portion is movable in the second arcuate direction along the actuating path from the first end position to the neutral position and from the neutral position to the second end position;

a shaft longitudinally extending along a shaft axis parallel to the rotatable axis and being rotatable about the shaft axis, wherein the shaft is disposed on the first side of the plane defined by the longitudinal and rotatable axes and a portion of the shaft is disposed proximate to the lever portion;

an eccentric mounted on the portion of the shaft disposed proximate to the lever portion to rotate as the shaft rotates, wherein the eccentric moves into the actuating path on the first side of the plane defined by the longitudinal and rotatable axes when the eccentric is rotated to a first rotation position and the eccentric moves out of the actuating path when the eccentric is rotated to a different second rotation position;

wherein when the lever portion is at the neutral position and the eccentric is in the actuating path, the eccentric engages the lever portion to prevent the lever portion from moving in the first arcuate direction along the actuating path towards the first end position thereby acting as a shift lock blocking the lever from the first end position, and the eccentric disengages from the lever portion upon the lever portion moving in the second arcuate direction along the actuating path towards the second end position thereby allowing the lever portion to move from the neutral position towards the second end position;

wherein when the lever portion is at the first end position and the eccentric is in the actuating path, the eccentric engages the lever portion to force the lever portion to move in the second arcuate direction along the actuating path towards the neutral position;

wherein when the lever portion is between the neutral position and the second end position and the eccentric is in the actuating path, the eccentric is disengaged from the lever portion thereby allowing the lever portion to move between the neutral position and the second end position in both of the first and second arcuate directions; and an actuator operable for rotating the shaft to move the eccentric into and out of the actuating path such that the actuator is operable for activating and deactivating the shift lock for the shift lever.

2. The shifting device of claim 1 wherein:
the actuator includes a motor.

3. The shifting device of claim 1 wherein:
the shift lever is a gear selector switch.

4. The shifting device of claim 1 wherein:
the actuator changes the position of the shift lever when the lever portion is between the neutral position and the first end position by moving the eccentric into the actuating path of the shift lever.

5. The shifting device of claim 4 wherein:
the actuator allows the return the shift lever from the first end position to the neutral position by moving the eccentric out of the actuating path of the shift lever.

* * * * *